(12) United States Patent
Onuki

(10) Patent No.: US 6,439,082 B1
(45) Date of Patent: Aug. 27, 2002

(54) MULTI-STAGE TRANSMISSION OF VEHICLE

(75) Inventor: Shigemori Onuki, Kawasaki (JP)

(73) Assignee: Isuzu Motors Limited, Tokyo (JP)

(*) Notice: Subject to any disclaimer, the term of this patent is extended or adjusted under 35 U.S.C. 154(b) by 0 days.

(21) Appl. No.: 09/707,897

(22) Filed: Nov. 7, 2000

(30) Foreign Application Priority Data

Nov. 10, 1999 (JP) ............................................ 11-319915

(51) Int. Cl.⁷ ............................................ F16H 3/02
(52) U.S. Cl. ............................................ 74/745
(58) Field of Search ............................................ 74/745

(56) References Cited

U.S. PATENT DOCUMENTS

| | | | |
|---|---|---|---|
| RE26,953 E | * 9/1970 | Warren et al. | ................ 74/745 |
| 5,054,591 A | * 10/1991 | Braun | ....................... 192/3.63 |
| 6,105,449 A | 8/2000 | Genise et al. | |

FOREIGN PATENT DOCUMENTS

| | | |
|---|---|---|
| EP | 0 480 633 A2 | 4/1992 |
| EP | 0 947 371 A2 | 10/1999 |
| JP | 07266907 A | 10/1995 |
| JP | 08091071 A | 4/1996 |
| JP | 08159258 A | 6/1996 |
| WO | 94/13981 | 6/1994 |

* cited by examiner

*Primary Examiner*—Dirk Wright
(74) *Attorney, Agent, or Firm*—McCormick, Paulding & Huber LLP

(57) ABSTRACT

A multi-stage transmission (3) of which gears do not rattle when an engine (1) is idling. The multi-stage transmission (3) is equipped with a splitter (17) that has a neutral position (N). The splitter (17) is located between a clutch (2) and a main transmission (18). A drive power from the engine (1) is not transmitted to the main transmission when the splitter (17) is in the neutral position. Thus, a counter shaft (32) in the transmission (3) does not rotate, and the gears in the transmission (3) do not rattle. The splitter (17) is shifted to a high or low gear (H or L) after a predetermined interval (tint) so that the gears rotate and lubrication oil is caused to splash. When the splitter (17) is in the neutral position, the lubrication oil is not fed to shaft supports (bearings) in the transmission (3). The interval period is determined from temperature of the lubrication oil.

12 Claims, 6 Drawing Sheets

| SPLITTER GEAR POSITION | ELECTROMAGNETIC VALVE ON | | | POSITION SENSOR ON | | |
|---|---|---|---|---|---|---|
| | H | L | N | H | L | N |
| H | ○ | | | ○ | | |
| L | | ○ | | | ○ | |
| N | ○ | ○ | | | | ○ |

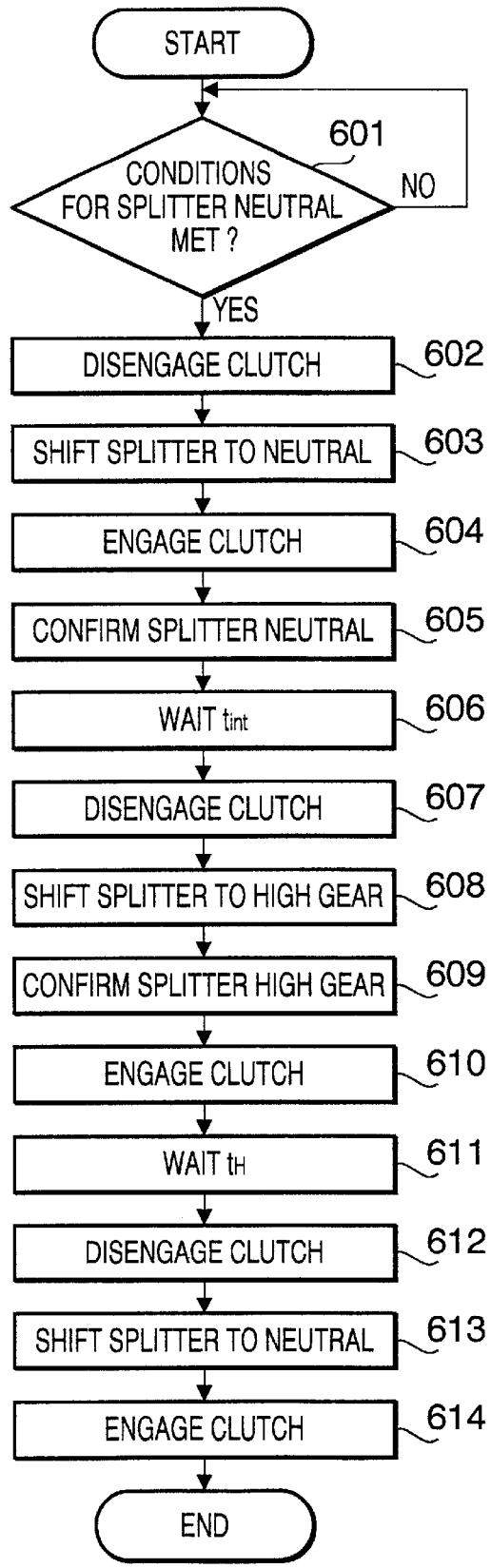

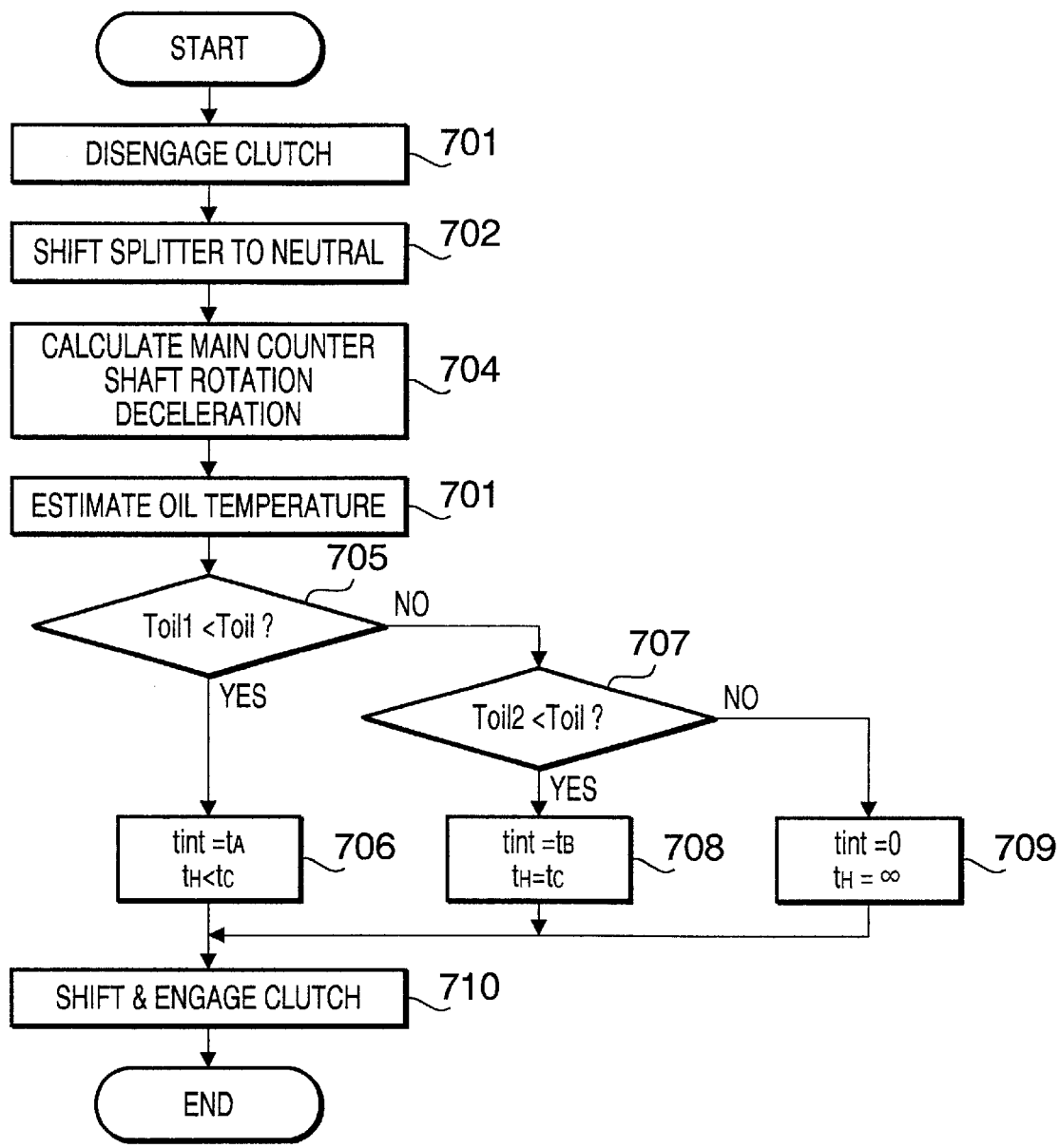

MULTI-STAGE TRANSMISSION OF VEHICLE

BACKGROUND OF THE INVENTION

1. Field of the Invention

The present invention relates to a multi-stage transmission for a vehicle such as tractors.

2. Description of the Related Art

A weight of a tractor-trailer greatly changes from when it runs with a trailer to when without a trailer. In order to improve vehicle's running performance, a splitter (secondary transmission) having high and low gear positions is sometimes provided between a clutch and a main transmission. One example of such splitter is disclosed in, for example, Japanese Patent Application Laid-Open Publication No. 8-159258.

The conventional splitter has, however, only two gear positions, i.e., high and low, for high and low speed driving, and is always engaged in one of them.

Some of long-distance drivers have a rest and take a nap in a vehicle, with an air conditioner being turned on. Such vehicle is parked in an idling condition so that a drive power of an engine is transmitted to a counter shaft of the main transmission via the splitter. As a result, a counter gear mounted on the counter shaft and a main gear mounted on a main shaft always engage with each other and rotate. As teeth of the gears encounter, they rattle. The driver inside the vehicle hears this noise.

To overcome this problem, one with an ordinary skill in the art might modify a damping characteristic of a clutch, or additionally provide a scissors gear. In either measures, however, the engine drive power is still transmitted to the counter shaft. Thus, the fundamental problem remains unsolved. Further, a total power transmission line is elongated so that installing a modified clutch/scissors gear itself may be difficult.

SUMMARY OF THE INVENTION

An object of the present invention is to overcome the above described problems.

According to one aspect of the present invention, there is provided a multi-stage transmission for a vehicle that includes a main transmission, and a splitter (secondary transmission) located between a clutch and main transmission, wherein the splitter has high and low gear positions and a neutral position. Since a drive power from an engine can be discontinued at the splitter when the splitter is in the neutral position, it is possible to prevent gears from rattling in the main transmission.

The multi-stage transmission may further include a splitter controller for shifting the splitter to the neutral position and maintaining the neutral condition for a predetermined period when predetermined conditions are met. The splitter controller may also cause the splitter to be shifted to the high or low gear repeatedly at predetermined intervals. The splitter controller may determine at least one of the predetermined period and interval from temperature of lubrication oil. A counter shaft in the main transmission is rotated by the engine drive power transmitted via the splitter. The splitter controller may estimate the lubrication oil temperature based on drop of rotation speed of the counter shaft.

Additional objects, benefits and advantages of the present invention will become apparent to those skilled in the art to which this invention relates from the subsequent description of the embodiments and the appended claims, taken in conjunction with the accompanying drawings.

BRIEF DESCRIPTION OF THE DRAWINGS

FIG. 6 is a flowchart showing a fundamental control for a splitter; and

FIG. 7 illustrates a flowchart for determining interval period and lubrication period.

DETAILED DESCRIPTION OF THE INVENTION

Now, an embodiment of the present invention will be described in reference to the accompanying drawings.

Figure 1:
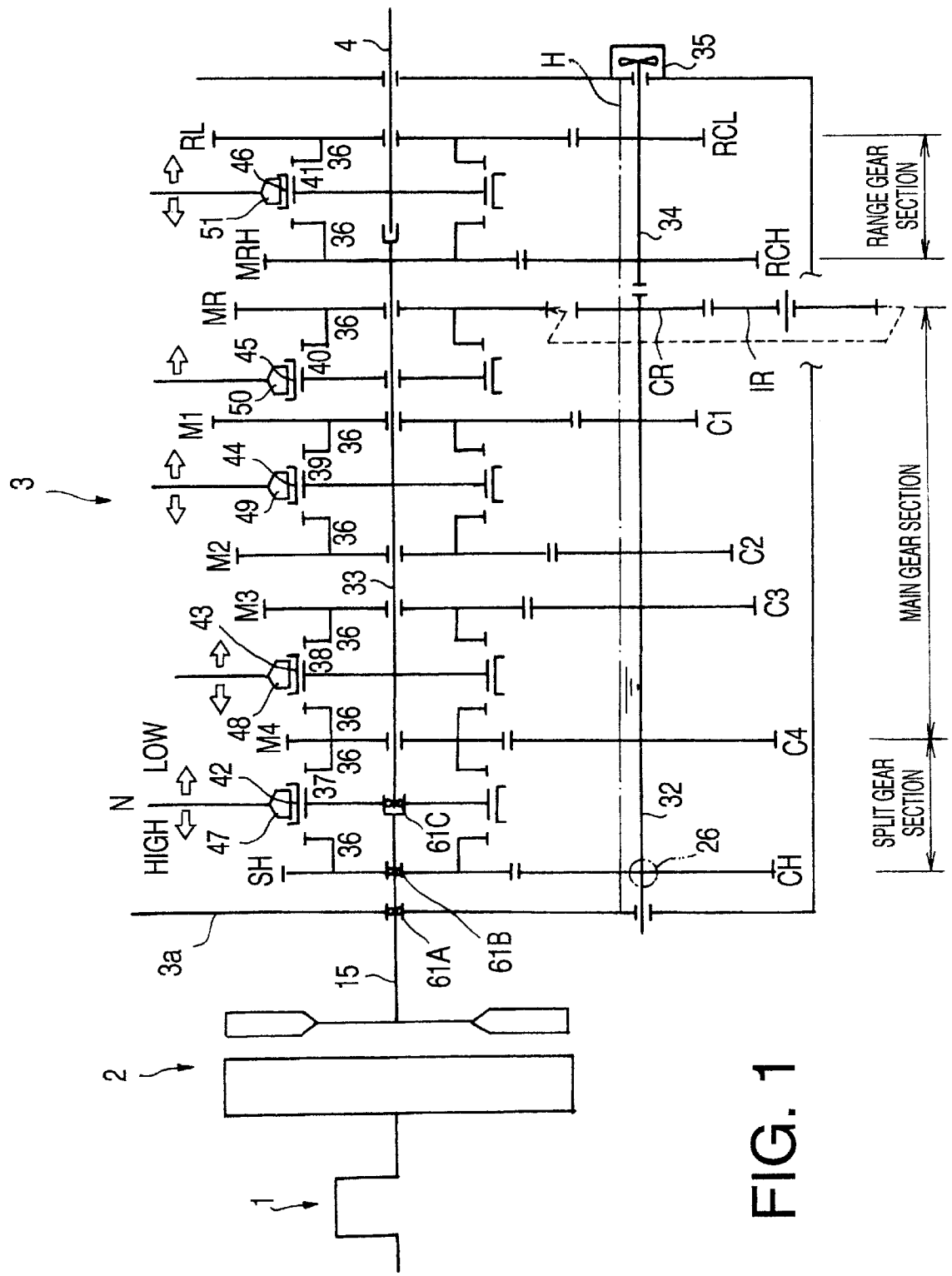
FIG. 1 schematically illustrates a structure of a multi-stage transmission according to the present invention.
Figure 2:
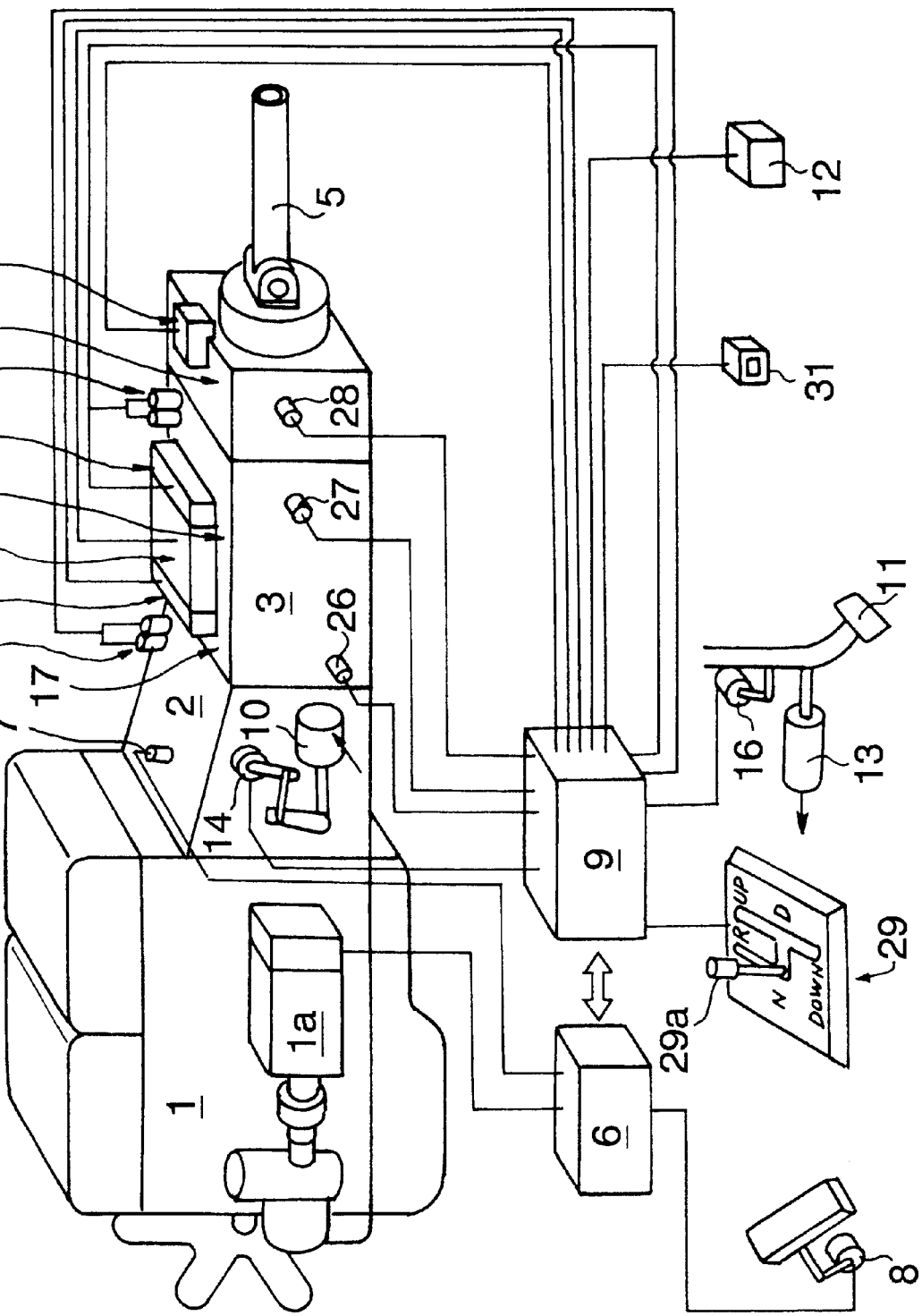
FIG. 2 illustrates an engine and its drive power transmitting line.

Referring first to FIG. 2, illustrated are an engine (diesel engine) 1 and its drive power transmission line. A multi-stage transmission 3 is connected to the engine 1 via a clutch 2. An output shaft 4 (FIG. 1) of the transmission 3 is connected to a propeller shaft 5 to drive an axle of rear wheels (not shown). The engine 1 is electronically controlled by an engine control unit (ECU) 6. Specifically, ECU 6 reads a current engine revolution speed and engine load from an engine speed sensor 7 and accelerator depression sensor 8, and controls a fuel injection pump 1a primarily based on the sensed speed and load. Accordingly, a timing and amount of fuel injection are appropriately controlled.

In this embodiment, the clutch 2 and transmission 3 are both automatically operated by a transmission control unit (TMCU) 9. ECU 6 and TMCU 9 communicate with each other over bus or cables as indicated by the unshaded double arrow.

The clutch 2 is a mechanical friction type, and automatically engaged with and disengaged from the engine 1 by a clutch actuator 10. It should be noted that a driver can also disengage and engage the clutch 2 manually by stamping a clutch pedal 11. Therefore, this clutch 2 is a so-called selective automatic clutch. The clutch actuator 10 is pneumatically actuated. Specifically, as air pressure is fed and released upon switching movement of an electromagnetic valve 12 under the control of TMCU 9, the clutch actuator 2 effects automatic disengagement and engagement of the clutch 2. The clutch actuator 10 also has a hydraulic valve therein for the manual operation. A master cylinder 13 feeds and releases oil to and from the hydraulic valve upon stamping and releasing of the clutch pedal 11, thereby opening and closing this valve. This controls air pressure feeding to and releasing from the clutch actuator 10, thereby effecting manual disengagement and engagement of the clutch 2. If the automatic disengagement and engagement of the clutch 2 interferes with the manual disengagement and engagement, the manual operation is given priority.

A clutch stroke sensor 14 for detecting a clutch stroke and a clutch pedal stroke sensor 16 for detecting how deep the clutch pedal 11 is stamped are respectively connected to TMCU 9.

The transmission 3 is a fundamentally "always engaged" type, and includes a split gear stage 17 on its input side, range gear stage 19 on its output side and main gear stage 18 therebetween. A drive power of the engine which is transmitted to the input shaft 15 of the transmission 3 is delivered to the output shaft 4 via the split gear stage 17, main gear stage 18 and range gear stage 19. The splitter gear stage 17 serves as a secondary transmission on the input side, and is the splitter of the present invention. The range gear stage 19 serves as a secondary transmission on the output side, and the main gear stage 18 is a main transmission section of the transmission 3.

The transmission 3 is equipped with a splitter actuator 20, main actuator 21 and range actuator 22 for automatic gear change operation of the split gear stage 17, main gear stage 18 and range gear stage 19 respectively. Like the clutch actuator 10, these actuators are also pneumatically driven under the control of TMCU 9. A split gear position sensor 23, main gear position sensor 24 and range gear position sensor 25 are provided for detecting current gears of the gear stages 17, 18 and 19, respectively, and connected to TMCU 9. The transmission 3 is further equipped with a main counter shaft rotation speed sensor 26, main shaft rotation speed sensor 27 and output shaft rotation speed sensor 28, and these sensors are connected to TMCU 9.

In general, disengagement and engagement control for the clutch 2 and gear position change (shift) control for the transmission 3 are triggered by a signal from a shift lever unit 29 located in a driver/passenger compartment. Specifically, as the driver shifts a shift lever 29a to a certain position, a corresponding signal for instructing gear position change is sent to TMCU 9. Subsequently, TMCU 9 appropriately activates the clutch actuator 10, splitter actuator 20, main actuator 21 and range actuator 22 based on the instruction signal, thereby completing a series of shifting operations. TMCU 9 then displays the current gear position in a monitor 31.

A parking brake switch, PTO (Power Take Off) switch and the like are also connected to TMCU 9 so that running and operating conditions of the vehicle are always monitored.

Referring to FIG. 1, illustrated is an inside structure of the transmission 3. Left in the drawing is front of the transmission. As illustrated, the input shaft 15, main counter shaft 32 (counter shaft recited in the claims), main shaft 33, range counter shaft 34 and output shaft 4 are housed in a transmission casing 3a. The input shaft 15, main shaft 33 and output shaft 4 are coaxially arranged, and the main counter shaft 32 and range counter shaft 34 coaxially extend below and in parallel to these shafts.

The input shaft 15 is rotatably supported by the transmission casing 3a at its approximate center. The front end of the input shaft 15 is connected to an output element of the clutch 2, and the rear end fits over the front end of the main shaft 33 such that the main shaft 33 is rotatably supported by the input shaft 15. Likewise, the rear end of the main shaft 33 fits over the front end of the output shaft 4 such that the output shaft is rotatably supported by the main shaft 33. An intermediate point of the output shaft 4 is supported by the transmission casing 3a. The main counter shaft 32 and range counter shaft 34 are independently and rotatably supported by the transmission casing 3a. Transmission oil is maintained in the transmission casing 3a, and its surface (or height) is indicated by H (single dot line). The range counter shaft 34 has an oil pump 35 at its rear end for causing the oil to move and circulate.

A split high gear SH is rotatably mounted on the input shaft 15, and main gears M4, M3, M2, M1 and MR are rotatably mounted on the main shaft 33. These gears except the last main gear MR always engage with counter gears CH, C4, C3, C2 and C1 fixed on the main counter shaft 32 respectively. The gear MR always engages with a reverse idle gear IR, and the reverse idle gear IR always engages with a counter gear CR secured on the main counter shaft 32.

A main gear MRH is also secured on the rear end of the main shaft 33, and a range gear RL is rotatably mounted on the output shaft 4. These gears MRH and RL always engage with range counter gears RCH and RCL secured on the range counter shaft 34 respectively.

Each of the gears SH, M4, . . . and RL mounted on the input shaft 15, main shaft 33 and output shaft 4 has one or two splines 36 for gear selection, and first to fifth splines 37 to 41 are provided between the splines 36. The first spline 37 extends from the rear end of the input shaft 15, and second and third splines 38 and 39 extend from the main shaft 33. The fourth spline 40 is rotatably mounted on the rear end of the main shaft 33. The fifth spline 41 extends from the output shaft 4. First to fifth sleeve 42 to 46 are engaged with the first to fifth splines 37 to 41 and they are slidable forward and backward (right and left in the drawing). As the first to fifth sleeves 42 to 46 slide as indicated by the unshaded arrows, they are engaged with and disengaged from the adjacent gears' splines 36 thereby coupling/separating the first to fifth splines 37 to 41 with/from the gears' splines 36.

First to fifth shift arms 47 to 51 are engaged with the first to fifth sleeves 42 to 46. The first shift arm 47 is connected to the splitter actuator 20, the second to fourth shift arms 48 to 50 are connected to the main actuator 21, and the fifth shift arm 51 is connected to the range actuator 22.

As understood from the above description, the transmission 3 is an "always engaged" type, which is automatically shifted by the actuators. The actuators appropriately move the first to fifth sleeves 42 to 46 so as to connect some of the splines with each other for arbitrary gear selection. It should be noted that like a conventional arrangement the illustrated splines have synchronization mechanisms (not shown) for engagement. In this embodiment, eight gear positions for forward movement are available in each of the high and low conditions of the split gear stage 17, and one gear position for backward movement is available.

The front gears SH/CH to the main gear M4/counter gear C4 constitute the split gear stage 17, the main gear M4/counter gear C4 to the main gear MR/counter gear CR/reverse idle gear IR constitute the main gear stage 18, and the main gear MRH/range counter gear RCH to the rearmost gears RL/RCL constitute the range gear stage 19. The main gear M4 and counter gear C4 serve as not only the low gear of the split gear stage 17, but also seventh and eighth gears of the main gear stage 18.

In the split gear stage 17, if the first shift arm 47 causes the first sleeve 42 to shift forward, the high gear is engaged (high gear position), and if it moves the first sleeve 42 backward, the low gear is engaged. Further, when the first shift arm 47 shifts the first sleeve 42 to an intermediate position, a neutral condition (N) is obtained. In the neutral condition, the first sleeve 42 rests on the first spline 37, and does not engage with any of the adjacent splines 36. The conventional arrangement does not have such neutral position, and the high or low gear must be selected.

By providing the neutral position, it is possible to prevent the gears from rattling, unlike the conventional arrangement. Specifically, when the vehicle is parked in an idling condition, the clutch 2 is engaged and the main gear section 18 is in the neutral condition. At this point, if the split gear section 17 has been shifted to the high gear, the engine drive power is transmitted to the input shaft 15, first spline 37, first sleeve 42, spline 36 of the split high gear SH, split high gear SH, and counter gear CH, and reach the main counter shaft 32. If it occurs, the counter gears C4, C3, C2, C1 and CR fixed on the main counter shaft 32, the main gears M4, M3, M2, M1 and MR rotatably mounted on the main shaft 33 and the reverse idle gear IR engage with each other and rotate together. As a result, the gears rattle.

When the split gear section 17 has been shifted to the low gear, the engine drive power is transmitted to the input shaft 15, first spline 37, first sleeve 42, spline 36 of the main gear M4, main gear M4, and counter gear C4, and reach the main counter shaft 32. If it occurs, the above mentioned gears engage with each other and rotate together. As a result, the gears make noises.

If, however, the split gear section 17 is shifted to the neutral position, the engine drive power is not transmitted no further than the input shaft 15. Accordingly, only the input shaft 15, first spline 37 and first sleeve 42 rotate. Consequently, it is possible to prevent the gears from rotating and rattling.

Figures 3, 4:
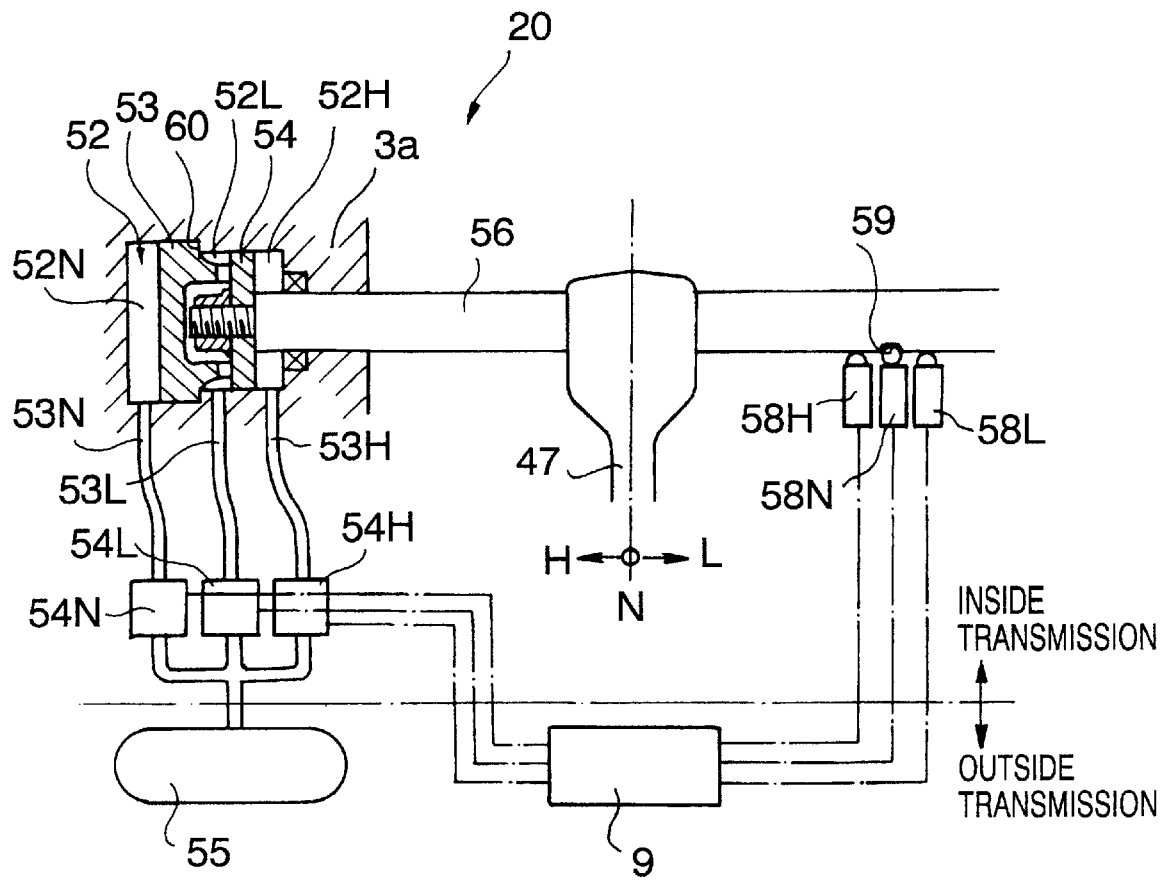
FIG. 3 illustrates a splitter actuator.
FIG. 4 illustrates an operation matrix for the splitter actuator shown in FIG. 3.

Referring now to FIG. 3, illustrated is a detail of the split actuator 20 for realizing selection of the neutral position as described above. Specifically, a cylinder chamber 52 is defined in the transmission casing 3a, and first piston 53 and second piston 54 are received in the cylinder chamber 52, thereby dividing the cylinder chamber 52 into three sub-chambers 52N, 52L and 52H. Air pressure ports 53N, 53L and 53H are formed in the transmission casing 3a and extend to the sub-chambers 52N, 52L and 52H respectively from an air tank 55. Electromagnetic valves 54N, 54L and 54H are provided on the air pressure ports 53N, 53L and 53H respectively. A striking rod 56 is attached to the second piston 54 and movable forward and backward (forward is leftward in the drawing). The first shift arm 47 that engages with the first sleeve 42 is secured on the striking rod 56.

Therefore, the first and second pistons 53 and 54 can cause the first shift arm 47 to move to three different positions, whereby the first sleeve 42 can be shifted to the neutral position (N), high gear (H) and low gear (L).

In order to detect these gear positions, position sensors 58N, 58L and 58H are associated with the striking rod 56. Each position sensor includes a detent ball switch. The striking rod 56 has a single detent recess 59 to receive one of the balls of the position sensors 58N, 58L and 58H. That position sensor whose ball falls in the recess 59 is only turned on so that it is possible to determine which position or gear is selected. The electromagnetic valves 54N, 54L and 54H and the position sensors 58N, 58L and 58H are connected to TMCU 9.

Referring to FIG. 4, illustrated is relationship between the gear positions, electromagnetic valves and position sensors. If the high gear is selected by a driver, the electromagnetic valve 54H is turned on, and other two electromagnetic valves 54N and 54N are turned off. As the electromagnetic valve 54H is turned on, the associated air passage 53H is opened. Therefore, air pressure or pressurized air is fed to the cylinder chamber 52H from the air tank 55 via the air passage 53H. The air passages 53N and 53L on which the turned off electromagnetic valves 54N and 54L are attached are opened to the atmosphere so that the associated chambers 52N and 52L have atmospheric pressure. In this condition, since the air pressure is only applied to the chamber 52H, the two pistons 53 and 54 are simultaneously moved to the most forward position in the cylinder chamber 52. As a result, the split gear section 17 is shifted to the high gear. On other hand, if the driver selects the low gear, the electromagnetic valve 54L is only turned on. Then, the first piston 53 is moved to the most forward position 54, and the second piston 54 is moved to the most backward position. This shifts the split gear section 17 to the low gear.

When the driver selects the neutral position, the electromagnetic valves 54N and 54H are both turned on, and the electromagnetic valve 54L is turned off. In this condition, the first and second pistons 53 and 54 are caused to approach each other, and eventually the first piston 53 abuts a shoulder 60 and stops, and the second piston 54 encounters the first piston 53 and stops. Thus, the first and second pistons 53 and 54 are positioned at an approximate center of the cylinder chamber 52, thereby shifting the split gear section 17 to the neutral position.

If the split gear section 17 is maintained at the neutral position for a long period, a problem will arise. As illustrated in FIG. 1, bearings are provided at all of shaft supports in the transmission 3, and lubricated by oil carried up (splashed) by the gears C4, C3, C2, . . . and oil fed from the oil pump 35. However, if the split gear section 17 is shifted to the neutral position, the main counter shaft 32 is not caused to rotate so that the lubrication oil is not splashed upward by the gears and the oil pump 35 is not driven. Accordingly, the bearings may suffer from insufficient lubrication.

When the vehicle is parked in an idling condition and the split gear section 17 is in the neutral position, substantially only the input shaft 15 rotates. In actuality, therefore, the problem of insufficient lubrication is not a problem to other shafts and associated bearings. Nevertheless, there is a possibility that the input shaft 15 and associated bearings will be damaged due to insufficient lubrication. Specifically, three bearings 61A, 61B and 61C may excessively wear and burn.

In the present invention, therefore, the split gear section 17 is periodically shifted to the high or low gear from the neutral position for a predetermined period so as to cause the main counter shaft 32 to rotate occasionally. Accordingly, the problem of insufficient lubrication would not arise.

The fundamental approach for eliminating the above problem will be described in detail in reference to FIG. 6. The procedure shown in the flowchart of FIG. 6 is executed by TMCU 9. It should be assumed here that a vehicle is parked in an idling condition and a driver is napping in the vehicle with an air conditioner being turned on.

TMCU. 9 first determines at Step 601 whether or not conditions for bringing the split gear section (splitter) 17 into the neutral position are-met. The conditions are the main gear section being in a neutral position, vehicle speed being substantially zero, parking brake being applied, and PTO switch being off. These states should last a predetermined period (e.g., three seconds). If the answer at Step 601 is yes, the program proceeds to Step 602. Otherwise, Step 601 is repeated.

At Step 602 the clutch 2 is automatically disengaged, and at the subsequent Step 603 the splitter actuator 20 is activated to shift the split gear section 17 to the neutral position. After that, the program proceeds to Step 604 to automatically engage the clutch 2. Then, at Step 605 it is confirmed from the output signal of the position sensor 58N that the split gear section 17 is in the neutral position. Upon confirming of the neutral condition, a timer (not shown) is activated to count the time at Step 606 thereby waiting for a predetermined interval $t_{int}$. This interval $t_{int}$ is determined based on oil temperature (will be described).

After the predetermined period, the clutch 2 is automatically disengaged at Step 607 and the split gear section 17 is shifted to the high gear at Step 608. When the position sensor 58H indicates that the split gear section 17 has been shifted to the high gear (Step 609), the clutch 2 is automatically engaged at Step 610. This causes the main counter shaft 32 to rotate, thereby lubricating the shaft supports.

Then, the timer counts another predetermined period $t_H$ at Step 611. This period is determined according to a certain rule which is described later. After the period $t_H$, the clutch 2 is automatically disengaged at Step 612, and the split gear section 17 is returned to the neutral position at Step 613. Finally, the clutch 2 is automatically engaged at Step 614 to finish this control.

The interval $t_{int}$ at Step 606 and the period $t_H$ at Step 611 will be described specifically. The interval $t_{int}$ is a period during which the transmission gears do not rattle since the split gear section 17 is in the neutral position. The period $t_H$ is a period during which the split gear section 17 is in the high gear, i.e., a lubrication period. In this period, the transmission gears rattle since the gears are engaged.

As understood from the above, the fundamental control shown in FIG. 6 causes the split gear section 17 to shift to the high gear repeatedly after the predetermined interval $t_{int}$, thereby forcing the main counter shaft 32 to rotate for the predetermined period $t_H$ for lubrication. The length of the interval $t_{int}$ and that of the lubrication period $t_H$ are important in terms of balance of lubrication and noise. In this particular embodiment, the lubrication oil temperature, i.e., viscosity is used to determine how much the lubrication is needed. Based on this determination, the interval $t_{int}$ is decided.

Specifically, when the lubrication oil temperature is high and its viscosity is low, the lubrication oil tends to be insufficient at the shaft supports. Accordingly, the lubrication should be made more frequently with a shorter interval $t_{int}$. In this case, the lubrication period $t_H$ is also set to relatively short since the lubrication oil is easy to permeate the bearings. On the other hand, when the lubrication oil temperature is low and its viscosity is high, the lubrication oil tends to remain at the shaft supports. Accordingly, the interval $t_{int}$ is set to relatively long. In this case, the lubrication period $t_H$ is also set to relatively long since the lubrication oil is not easy to permeate the bearings. If the lubrication oil temperature is extremely low and viscosity is extremely high, the interval $t_{int}$ is set to zero in order to quickly heat the lubrication oil and obtain desired lubrication property. In this case, the split gear section 17 is maintained at the high gear thereby causing the main counter shaft 32 to rotate continuously at high speed. Thus, the lubrication oil is agitated and lubrication continues. Since large viscosity resistance occurs between the gears, the gears hardly rattle in this instance.

Based on this idea and actual machine testing as well as factor of safety, the interval $t_{int}$ and the lubrication period $t_H$ are determined.

If the lubrication oil temperature is a parameter, a sensor for detecting the lubrication oil temperature is needed. In the illustrated embodiment, however, such sensor is not provided; instead, the rotation speed sensor 26 for the main counter shaft 32 is utilized to predict the oil temperature from the drop of rotation speed of the main counter shaft 32, and the predicted value is used to determine interval $t_{int}$ and the period $t_H$. The sensor 26 picks up a rotation pulse from the counter gear CH, and is primarily provided for shift control. In this embodiment, this rotation speed sensor 26 also serves as the oil temperature sensor. This contributes to cost reduction.

Figure 5:
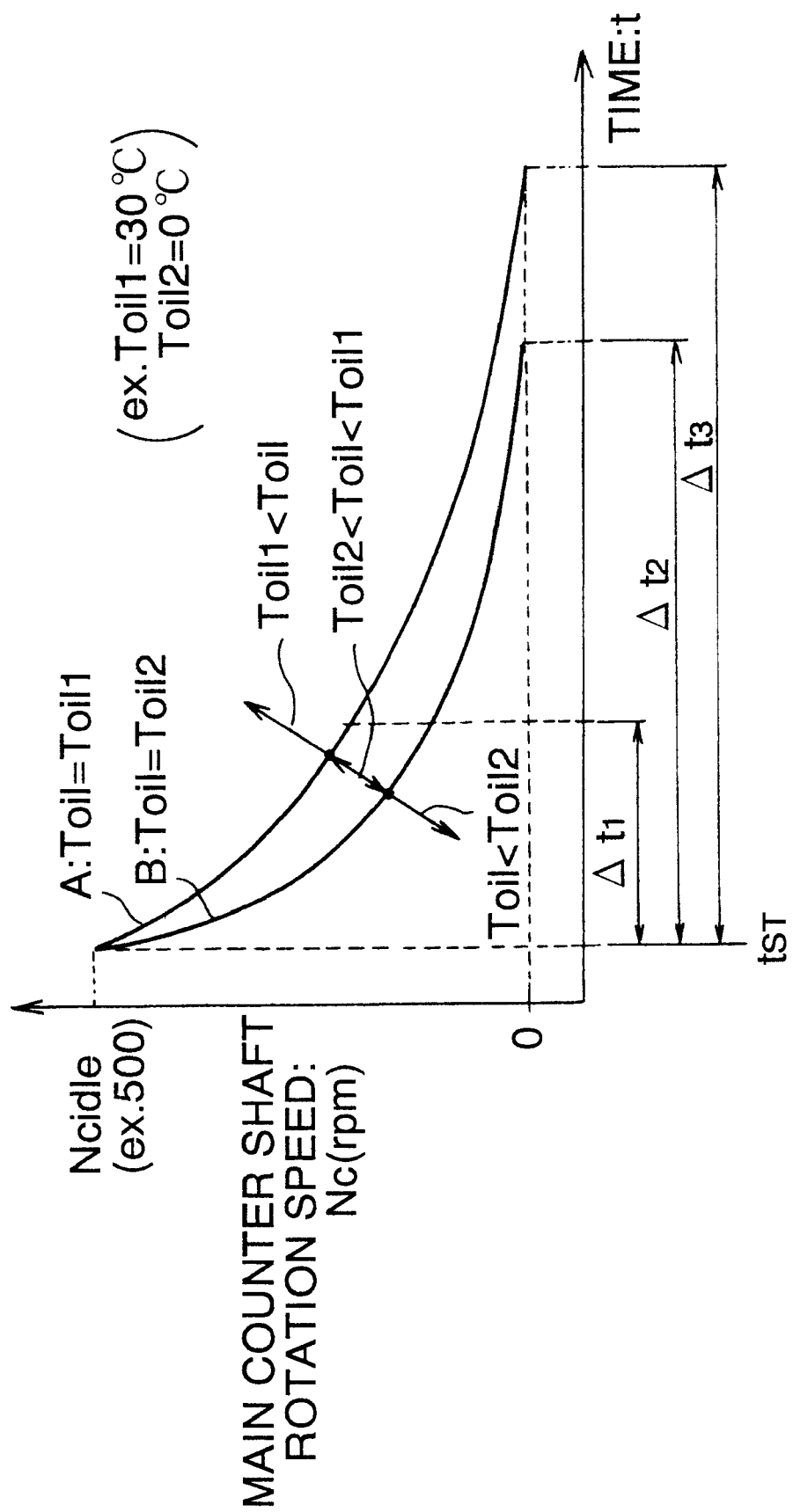
FIG. 5 illustrates a map used in determining oil temperature.

Referring to FIG. 5, illustrated is a map used in determining the lubrication oil temperature. The horizontal axis indicates time t, and vertical axis indicates main counter shaft rotation speed Nc (rpm). Two curves A and B show the drop of main counter shaft rotation speed Nc when the oil temperature Toil is Toil1 and Toil2 respectively. Toil1 is greater than Toil2. In this map, Toil1=30° C. and Toil2=0° C. The drop of the rotation speed Nc starts from the main counter shaft rotation speed Ncidle in the idling condition and ends at zero. Ncidle is 500 rpm. The rotation speed Nc starts dropping upon completion of clutch disengagement ($t_{st}$ in FIG. 5). This map for oil temperature determination is stored in TMCU 9 beforehand.

As depicted, the rotation speed Nc decreases more steeply when the oil temperature is low (Toil2) than when high (Toil1). Thus, the period needed for the rotation speed Nc to become zero is shorter when the oil temperature is low than when high ($\Delta t2 < \Delta t3$). In this map, Toil<Toil2 under the curve B, Toil2<Toil<Toil1 between the curves A and B, and Toil1<Toil above the curve A.

There are two ways of estimating the oil temperature from the actual decrease of the rotation speed Nc of the main counter shaft. One is measuring deceleration of the rotation speed Nc within a certain period ($\Delta t1$) from the beginning, and determining the oil temperature using the map based on the deceleration. The other is counting a period from the beginning to the end, comparing this period with $\Delta t2$ and $\Delta t3$, and determining the oil temperature using the map. In this embodiment, the former is employed since less time is required for time counting, but of course the latter may be employed.

Referring to FIG. 7, illustrated is a flowchart for a procedure to determine the interval $t_{int}$ and lubrication period $t_H$. This procedure is executed by TMCU 9. The determination is made along with the clutch control at the start of the vehicle.

Required initial conditions before the start of the vehicle are the shift lever 29a being in a neutral position (i.e., main gear section 18 is in the neutral position), the clutch 2 being engaged, and the engine being in the idling condition. From these conditions established, if the driver moves the shift lever into a drive range such as first gear, the clutch 2 is automatically disengaged to allow gearing of the transmission 3. At the same time, the split gear section 17 is shifted to the neutral position to estimate the oil temperature Toil and determine the interval $t_{int}$ and lubrication period $t_H$.

The illustrated flowchart starts upon the above mentioned driver's operating the shift lever 29a. At step 701, the clutch 2 is automatically disengaged and simultaneously at step 702 the split gear section (splitter) 17 is shifted to the neutral position. As a result, the main counter shaft rotation speed Nc drops from Ncidle. At step 703, this rotation speed deceleration is calculated, and at step 704 the oil temperature Toil is estimated from the resultant.

At the subsequent step 705, the estimated oil temperature Toil is compared with the preset value Toil1. If Toil1 is smaller than Toil, the program proceeds to step 706 to set that the interval $t_{int}$ be $t_A$ (about 2 hours) and the lubrication period $t_H$ be less than $t_c$ (about five minutes). If Toil1 is equal to or greater than Toil, the program proceeds to step 707 to compare the oil temperature Toil with another preset value Toil2. If Toil2 is smaller than Toil, the program proceeds to step 708 to set that the interval $t_{int}$ be $t_B$ (about 4 hours; $t_B > t_A$) and the lubrication period $t_H$ be $t_c$. If Toil2 is equal to or greater than Toil, the program proceeds to step 709 to set that the interval $t_{int}$ be 0 so as to cause the main counter shaft to continuously rotate until the oil temperature Toil reaches Toil2 for consistent lubrication.

After determining the interval $t_{int}$ and lubrication period $t_H$, the program proceeds to step 710 to perform the gear change control for the main gear section 18 and engagement control for the clutch 2.

In this manner, it is possible to obtain the longest interval $t_{int}$ and the shortest lubrication period $t_H$ in accordance with the oil temperature. Consequently, the lubrication and noise reduction have the best balance.

As understood from the above, the splitter actuator 20 and TMCU 9 constitute splitter controller in the claims.

It should be noted that the present invention is not limited to the illustrated embodiment. For example, although the clutch 2 is once disengaged (Step 607 in FIG. 6) prior to the splitter gear-in operation (Step 608), and the clutch 2 is engaged (Step 610) after confirming the gear-in (Step 609) in order to protect associated mechanical elements in the foregoing embodiment, the clutch 2 may not be disengaged and engaged if the main gear section 18 is in the neutral position and the engine 1 is idling since the transmission 3 is equipped with synchronization mechanisms. Further, the split gear section 17 is shifted to the high gear for lubrication in the embodiment since the main counter shaft's rotating faster is advantageous for lubrication, but the split gear section 17 may be shifted to the low gear (as long as no problem would occur due to insufficient lubrication). In sum, it is generally satisfactory if the split gear section 17 is shifted to other than neutral. The clutch 2 may be a full automatic type without a manual portion, or a manual type. Various values such as Toil1 and Toil2 may also be changed according to given conditions. Both the interval period and the lubrication period are determined from the oil temperature in the above embodiment, but only one of them may be determined in such way. In this case, the interval period may be decided based on the oil temperature since the lubrication period varies within a relatively narrow range.

The illustrated and described arrangement is disclosed in Japanese Patent Application No. 11-319915 filed on Nov. 10, 1999, the instant application claims priority of this Japanese Patent Application, and the entire disclosure thereof is incorporated herein by reference.

What is claimed is:

1. A multi-stage transmission comprising:

a main transmission; and a secondary transmission located between a clutch and the main transmission, the secondary transmission having high and low gear positions and a neutral position, wherein the secondary transmission is a splitter, and including a splitter controller for causing the splitter to be shifted to the neutral position and maintained for a predetermined interval in the neutral position when predetermined conditions are met.

2. The multi-stage transmission according to claim 1, wherein:

the splitter controller causes the splitter to be shifted to the high or low gear position after the predetermined interval and for thereafter maintaining it for a predetermined period in the high or low gear position to which it has been shifted.

3. The multi-stage transmission according to claim 1, wherein:

the splitter controller determines at least one of the predetermined period and interval from a temperature of lubrication oil.

4. The multi-stage transmission according to claim 3, wherein:

the main transmission has a counter shaft rotated by engine drive power transmitted via the splitter, and the splitter controller estimates the lubrication oil temperature based on a drop of rotation speed of the counter shaft.

5. The multi-stage transmission as defined in claim 1, and further comprising:

another secondary transmission between the main transmission and a propeller shaft.

6. The multi-stage transmission as defined in claim 2, and further comprising:

another secondary transmission between the main transmission and propeller shaft.

7. The multi-stage transmission according to claim 1, wherein:

the predetermined conditions include the main transmission being in a neutral position, a vehicle speed being substantially zero, a parking brake being applied, and a PTO switch being off.

8. The multi-stage transmission according to claim 2, wherein:

the clutch is disengaged before the splitter is shifted to the high or low gear.

9. The multi-stage transmission according to claim 3, further including:

a temperature sensor for detecting the lubrication oil temperature.

10. The multi-stage transmission according to claim 2, wherein:

the predetermined period is less than five minutes and the predetermined interval is about two hours when the lubrication oil temperature is higher than about 30 degrees C.

11. The multi-stage transmission according to claim 2, wherein:

the predetermined period is about five minutes and the predetermined interval is about four hours when the lubrication oil is between about 0 and about 30 degrees C.

12. The multi-stage transmission according to claim 2, wherein:

the predetermined interval is zero and the splitter is kept to the high or low gear until the lubrication oil temperature is raised to zero degree C when the lubrication oil is below about zero degree C.

* * * * *